(12) United States Patent
Vanslette (10) Patent No.: US 11,498,734 B2
(45) Date of Patent: Nov. 15, 2022

(54) INSERT WITH REDEEMABLE CODE AND FUNCTIONALLY-RELATED PACKAGING

(71) Applicant: Apple Inc., Cupertino, CA (US)

(72) Inventor: Jeremy Vanslette, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/091,869

(22) Filed: Nov. 6, 2020

(65) Prior Publication Data

US 2021/0387783 A1     Dec. 16, 2021

Related U.S. Application Data

(60) Provisional application No. 63/038,476, filed on Jun. 12, 2020.

(51) Int. Cl.
| | |
|---|---|
| *B65D 75/14* | (2006.01) |
| *G06K 19/06* | (2006.01) |
| *G06F 16/955* | (2019.01) |
| *B65D 75/58* | (2006.01) |
| *B65B 5/04* | (2006.01) |

(Continued)

(52) U.S. Cl.
CPC ............ *B65D 75/14* (2013.01); *B65B 5/04* (2013.01); *B65B 7/20* (2013.01); *B65B 61/26* (2013.01); *B65D 75/54* (2013.01); *B65D 75/5805* (2013.01); *G06F 16/9554* (2019.01); *G06K 19/06037* (2013.01); *G06Q 20/354* (2013.01)

(58) Field of Classification Search
CPC ........ B65D 75/14; B65D 75/54; B65D 75/58; B65D 75/5805; G06F 16/9554; G06K 7/00; G06K 7/02; G06K 19/00; G06K 19/06; G06K 19/06037; G06Q 20/354; B65B 5/04; B65B 7/20; B65B 61/26
USPC ................... 206/449; 235/387, 486, 487
See application file for complete search history.

(56) References Cited

U.S. PATENT DOCUMENTS

| | | |
|---|---|---|
| 5,667,247 A | 9/1997 | Ramsburg et al. |
| 6,698,116 B2 | 3/2004 | Waldron |
| | (Continued) | |

FOREIGN PATENT DOCUMENTS

| | | | | |
|---|---|---|---|---|
| CA | 2337684 A1 * | 8/2002 | ............ | B42D 15/08 |
| CA | 2337684 A1 | 8/2002 | | |
| | (Continued) | | | |

*Primary Examiner* — Bryon P Gehman
(74) *Attorney, Agent, or Firm* — Sterne, Kessler, Goldstein & Fox P.L.L.C.

(57) ABSTRACT

A packaged redeemable code system is disclosed. The packaged redeemable code system includes a paper insert having a front surface with a removable item, and a rear surface with redeemable code. The packaged redeemable code system further includes a paper sleeve having an interior that encloses the paper insert and conceals the redeemable code. The paper sleeve also having a ripcord configured to open an edge of the paper sleeve to provide an access point for removal of the paper insert. The paper sleeve further having a front surface with a cutout extending therethrough. The cutout aligns with and provides visual access to the removable item. The removable item is a different color than or provides contrast with the front surface of the paper sleeve. The paper sleeve further having a rear surface with an activation code that is associated with the redeemable code.

21 Claims, 8 Drawing Sheets

(51) Int. Cl.
    *B65B 61/26*     (2006.01)
    *B65B 7/20*     (2006.01)
    *B65D 75/54*     (2006.01)
    *G06Q 20/34*     (2012.01)

(56) References Cited

U.S. PATENT DOCUMENTS

| | | |
|---|---|---|
| 6,732,459 B1 | 5/2004 | Clark |
| 6,877,263 B2 | 4/2005 | Clark |
| 7,537,168 B2 * | 5/2009 | Anderson ................. G09F 1/00 235/487 |
| 8,256,682 B2 * | 9/2012 | Chakiris .............. B42D 15/045 235/380 |
| 8,430,298 B2 * | 4/2013 | Martinez ............... G06Q 30/00 235/487 |
| 8,925,823 B2 * | 1/2015 | Chakiris .............. B42D 15/045 235/487 |
| 9,202,240 B2 | 12/2015 | Kingsborough |
| 9,227,775 B2 | 1/2016 | Boyer |
| 9,691,064 B2 | 6/2017 | Kingsborough |
| 9,907,374 B2 | 3/2018 | Canaday et al. |
| 10,423,867 B2 * | 9/2019 | Smith .............. G06K 19/06037 |
| 10,565,486 B2 * | 2/2020 | Pascua .................... B32B 27/06 |
| 2002/0100797 A1 | 8/2002 | Hollingsworth et al. |
| 2010/0133128 A1 | 6/2010 | Preece |
| 2011/0180434 A1 | 7/2011 | Corey et al. |
| 2018/0178962 A1 * | 6/2018 | Marr ...................... G06Q 20/22 |
| 2019/0050850 A1 | 2/2019 | Kingsborough |

FOREIGN PATENT DOCUMENTS

| | | | |
|---|---|---|---|
| WO | 2011/079066 A1 | 6/2011 | |
| WO | WO-2011079066 A1 * | 6/2011 | ....... G06K 19/06028 |

\* cited by examiner

INSERT WITH REDEEMABLE CODE AND FUNCTIONALLY-RELATED PACKAGING

CROSS-REFERENCE TO RELATED APPLICATIONS

This application claims the benefit of U.S. Provisional Application No. 63/038,476, filed on Jun. 12, 2020, the entire content of which is incorporated herein by reference.

FIELD

The described embodiments relate generally to redeemable codes on transaction cards and the like, and related packaging. More particularly, embodiments relate to packaging including an insert having a redeemable code enclosed within a sleeve.

BACKGROUND

Transaction cards and other items may include redeemable codes intended to remain hidden until the card is in the possession of its end user, who may then activate the card and/or redeem value using the redeemable code.

SUMMARY

A packaged redeemable code system that includes a paper insert having a front surface with a removable item, and a rear surface having redeemable code. The packaged redeemable code system further includes a paper sleeve having an interior that encloses the paper insert and conceals the redeemable code. The paper sleeve also has a front surface with a cutout extending therethrough. The cutout aligns with and provides visual access to the removable item. The removable item is a different color than or provides contrast with the front surface of the paper sleeve. The paper sleeve also has a rear surface having an activation code, wherein the activation code is associated with the redeemable code.

A packaged redeemable code system including an insert having a removable item and a redeemable code. The packaged redeemable code system further includes a sleeve having an interior that encloses the insert and conceals the redeemable code. The sleeve further having a front surface having a cutout extending therethrough, wherein the cutout aligns with and provides visual access to the removable item. The sleeve also having a rear surface having an activation code. The activation code is associated with the redeemable code and is not the same as the redeemable code.

A method of packaging a redeemable code system. The method includes associating a redeemable code with an activation code. The method includes applying the redeemable code on an insert. The method further includes assembling a sleeve around the insert to trap the insert within the sleeve and to conceal redeemable code within the sleeve. The method further includes applying the activation code on the sleeve.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

References to "an embodiment," "embodiments," etc., indicate that the embodiment described may include a particular feature, structure, or characteristic, but every embodiment may not necessarily include the particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

Redeemable codes can be used, for example with transaction cards or the like (e.g., gift cards) to represent a value (e.g., monetary value) that can be redeemed for goods, services, discounts, cash or the like. Some transaction cards may include one more redeemable codes or other visual information disposed on the card that is used to activate the card and to redeem or keep track of the value assigned to the card. For example, a user may purchase a transaction card from a vendor, and during the transaction the unique code disposed on the card can be used to activate the card so that the user may redeem the value of the card (e.g., by entering the unique code into an online system where the value of the card can be used to make purchases).

The transaction card can be any tangible card, document, or the like having information (e.g., a redeemable code) disposed thereon. The transaction card can be, for example, a stored-value card, gift card, telephone card, discount card, coupon, lottery ticket, or other card or document with redeemable code disposed thereon. The redeemable code may include, for example, any visual human-readable representation of data or any optical machine-readable representation of data. Examples include text having any number of characters or symbols, indicia, a linear barcode (e.g., a Universal Product Code), or a matrix barcode (e.g., a Quick Response "QR" Code). The transaction card or its redeemable code may have no associated value until the transaction card is activated.

Since the information disposed on the card can be associated with a certain value, it can be desirable to secure the redeemable code such that only an authorized user (e.g., the purchaser of the card) may view the redeemable code. For example, traditional gift cards may include a redeemable code concealed by a conceal strip and/or within a packaging. The gift card may also include an activation code, printed on the gift card itself, for activating the gift card. The activation code may be visible/accessible through a window of the packaging (e.g., a rectangular window around the activation code).

The following disclosure relates to a packaged redeemable code system. The packaged redeemable code system can include a sleeve and an insert. When packaged, the sleeve can contain or enclose the insert. When unpackaged, the insert can be removed from the sleeve in order to provide access to aspects of the insert. In embodiments, the sleeve forms a pocket and the insert is pulled out of the pocket in order to access aspects of the insert.

The sleeve and insert may be assembled in a variety of ways. In embodiments, the sleeve is formed over the insert. For example, the sleeve may be formed as a sheet that is folded over the insert to enclose the insert therein. In this example, the peripheral edges of the sheet may be glued or otherwise adhered to each other in order to form a pocket that retains the insert therein. One of the peripheral edges may include a flap that folds over a non-adhered edge in order to provide access to the insert. The flap may be adhered to a portion of the sleeve in order to fully secure the insert within the sleeve. The flap may be pulled open to allow access to the insert. In some cases, the sleeve and/or insert may be formed of paper (including stock of various thinknesses and strengths).

Additionally or alternatively, activation of the packaged redeemable code system may be governed by a dual activation process. The dual activation process may involve the association of a first code printed solely on the insert (not the sleeve) and a second code printed solely on the sleeve (not the insert). The first and second codes may together provide a secure activation of the packaged redeemable code system.

In embodiments, the first code may be a redeemable code and the second code may be an activation code associated with the redeemable code. Prior to activation, value associated with the redeemable code may be inaccessible. When activated by the activation code, the redeemable code may be used to perform transactions. For example, the redeemable code may have an assigned money value (e.g., $15).

In embodiments, the activation code is only located on a surface of the sleeve, and the redeemable code is only located on a surface of the insert. In such embodiments, the activation code is not located on the insert and as a result does not have to be accessed through a window of the sleeve. However, the redeemable code is entirely concealed within the sleeve when sealed within the packaged redeemable code system. Thus, the redeemable code is hidden and secure.

Additionally or alternatively, the insert may include a removable item. The removable item may, for example, be a decorative item such as a removable sticker or label. A sticker may, for example, be positioned on the insert such that it can be peeled off when the insert is removed from the sleeve.

In embodiments, the insert may be formed of single stock paper having a release coating. The removable item may be adhered to the release-coated single stock paper. The release coating can facilitate separation between the removable item and the insert.

Traditionally, release coatings have a glossy finish. In embodiments, the release coating that is applied to the insert has a matte finish. That is, the release coating provides an insert that is dull and flat without shine.

Additionally or alternatively, the sleeve may have a cutout that aligns with and provides visual access to at least a portion of the removable item while the insert is enclosed within the sleeve. The cutout may be embodied in a plurality of shapes and sizes.

In embodiments, the cutout is shaped to convey an aesthetic feature or message. For example, it may be shaped as a company logo or theme (e.g., Apple logo).

In embodiments, the cutout may be shaped to correspond to the removable item.

In embodiments, the removable item can be a different color than or provide contrast with the sleeve. For example, the sleeve may be formed of light tones while the removable item may be formed of dark tones (or vice versa).

Additionally or alternatively, the sleeve can include a ripcord configured to open an edge or flap of the sleeve in order to provide an access point for removal of the insert. The ripcord may an integral part of a label. The label may securely close the open edge or flap of the sleeve. By pulling the ripcord, the ripcord may rip an opening though the label in order to provide access to the open edge.

In embodiments, the ripcord may be tamper evident to provide notice that it has been tampered with.

In embodiments, the ripcord has mono directional clean tearing functionality. That is, the ripcord is only capable of tearing the label in a single direction. In such embodiments, instead of producing a serrated non-uniform tear line (e.g., as results from tearing a traditional perforated paper sheet), the ripcord produces a clean uniform tear line. To facilitate such clean tearing functionality, the ripcord does not include and is not guided by perforations, and does not include a support strip (e.g., a portion thicker or stronger than surrounding material that tears away with the ripcord).

Additionally or alternatively, the sleeve can include a hang tab, which may take the form of a panel. The hang tab allows the packaged redeemable code system to be hung on display, e.g., in a retail environment.

In embodiments, the hang tab may be removable or separable from the sleeve. This may enable the packaged redeemable code system to be displayed in a stacked configuration within a retail environment.

In embodiments, the hang tab has mono directional clean tearing functionality. That is, the hang tab is only capable of tearing in a single direction. Instead of producing a serrated non-uniform tear line, hang tab produces a clean uniform tear line.

These and other embodiments are discussed below with reference to FIGS. 1-14. Those skilled in the art will readily appreciate that the detailed description given herein with respect to these figures is for explanatory purposes only and should not be construed as limiting.

Figure 1:
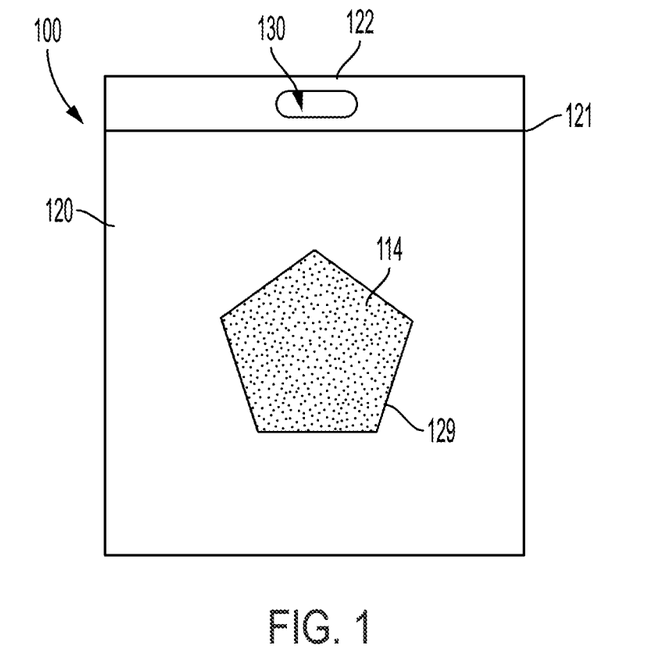
FIG. 1 shows a front view of a packaged redeemable code system.
Figure 7:
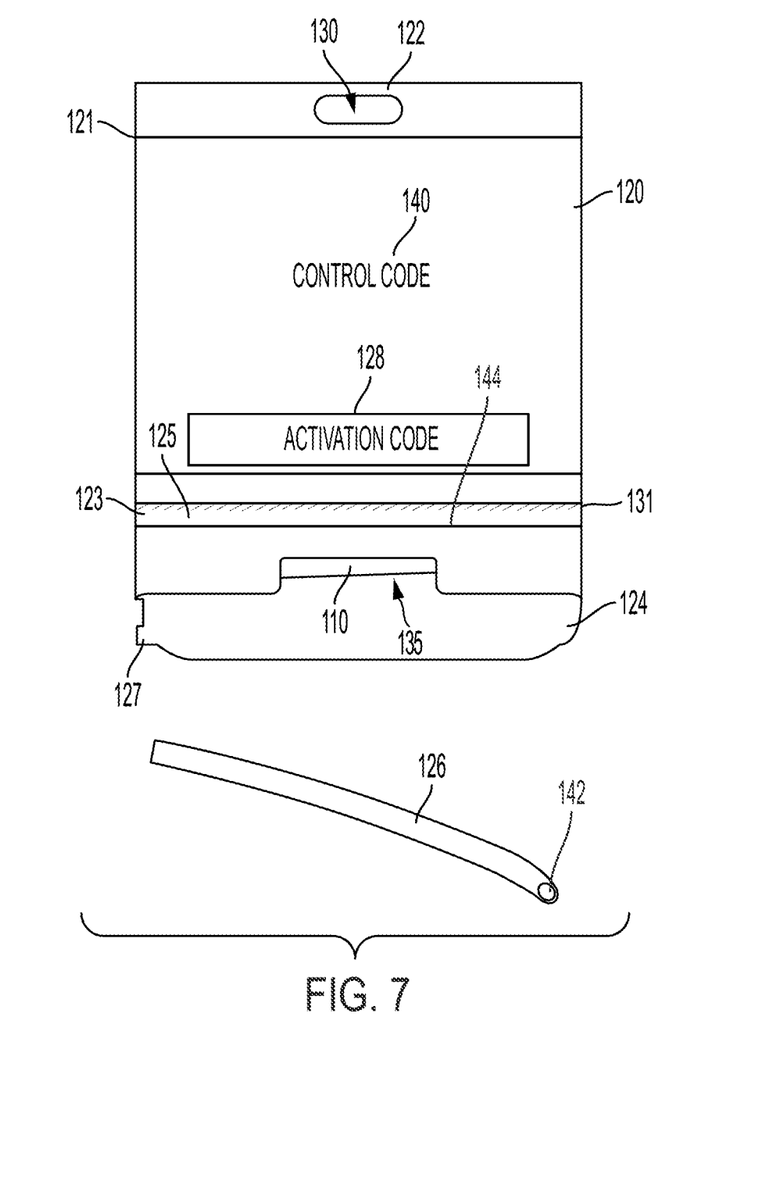
FIG. 7 shows the ripcord fully removed from of the sleeve of FIG. 2.

Packaged redeemable code system 100 can include sleeve 120 and insert 110. When packaged as shown in FIG. 1, sleeve 120 can contain or enclose insert 110 such that aspects of insert 110 are concealed within sleeve 120. When unpackaged as shown in FIG. 7, insert 110 can be removed from sleeve 120 in order to provide access to aspects of insert 110.

Packaged redeemable code system 100 may be governed by a dual activation process. The dual activation process may involve the association of a redeemable code 112 disposed solely on insert 110 (i.e., redeemable code 112 is not disposed on sleeve 120) and an activation code 128 disposed solely on sleeve 120 (i.e., activation code 128 is not disposed on insert 110) to provide a secure activation of packaged redeemable code system 100, as discussed in greater detail subsequently herein.

In embodiments in which activation code 128 is only located on a surface of the sleeve 120 and redeemable code 112 is only located on a surface of insert 110, activation code 128 can remain accessible while the redeemable code 112 is securely concealed within sleeve 120 of packaged redeemable code system 100.

Insert 110 can be a card, sheet, panel, etc., such as a transaction card or a gift card. Insert 110 can include redeemable code 112, which may be associated with a value (e.g., monetary value) redeemable by a user. The term "code," as used herein, may include, for example, any visual human-readable representation of data or any optical machine-readable representation of data. Examples include text having any number of characters or symbols, indicia, a linear barcode (e.g., a Universal Product Code), or a matrix barcode (e.g., a Quick Response "QR" Code).

The value associated with redeemable code 112 may not be redeemable (e.g., not accessible or creditable to a user) until redeemable code 112 is activated using activation code 128. Redeemable code 112 cannot be activated without the activation code 128, and activation code 128 is not provided on insert 110. That is, in embodiments no activation information is provided on insert 110.

Redeemable code 112 may be unique to insert 110. For example, embodiments can include a plurality of packaged redeemable code systems 100, each with a respective insert 110 and sleeve 120. The redeemable code 112 of each insert 110 may be unique (i.e., different from) redeemable codes 112 of any other insert 110.

Insert 110 can include insert code 116, which may be a serial number or gift card number of insert 110 and that may serve as an identifier for manufacturing of packaged redeemable code system 100, as discussed subsequently herein. Insert code 116 itself has no redeemable value. Insert code 116 itself cannot be used to activate redeemable code 112.

In embodiments, insert code 116 can be provided on an outer surface of insert 110.

Insert 110 can include a control code 118. Control code 118 can correspond to an aspect of the manufactured insert 110, such as a denomination, a promotional suite that can include combinations of colors, symbols, indicia, brands, etc. Control code 118 can have no redeemable value.

In embodiments, control code 118 can be provided on an outer surface of insert 110.

In some embodiments, codes included on insert 110 (redeemable code 112, insert code 116, control code 118) may be separate or may be combined in any combination into one or more combined codes. Further, some embodiments may include fewer than all of redeemable code 112, insert code 116, control code 118. For example, some embodiments may include only redeemable code 112, some embodiments may include redeemable code 112 and insert code 116, some embodiments may include redeemable code 112 and control code 118.

In embodiments, insert 110 can be formed of paper, which is readily recyclable. In embodiments, insert 110 can be formed of one, single-layer stock of paper. In embodiments, insert 110 can be formed of other suitable material such as plastics, metals, etc.

In embodiments, redeemable code 112 can be provided on an outer surface of insert 110.

In embodiments, insert 110 can include an item 114 that is removable from insert 110. For example, item 114 can be removably adhered to insert 110 via an adhesive layer provided on a rear surface of item 114. Insert 110 can include a release surface 115 that item 114 is attached to and removable from. For example, release surface 115 may be formed by coating a surface of the single-layer stock of material (e.g., paper) that forms insert 110. The coating can be a matte surface coating. In such embodiments, item 114 can be directly attached to release surface 115 of single-layer stock insert 110 and thereby obviate the need for additional cumbersome layers of insert 110.

Figure 4:
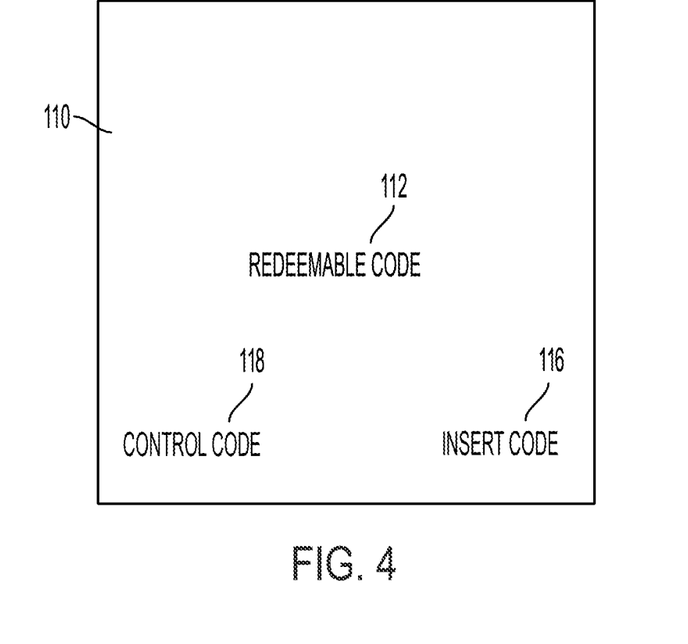
FIG. 4 shows a rear view of the insert of FIG. 3.

Item 114 can be collectable (e.g., a sticker). Item 114 can be decorative (e.g., it can be colored, it can include patterns, indicia, etc.). In embodiments, item 114 can be disposed on a different outer surface of insert 110 from the outer surface that redeemable code 112, insert code 116, and control code 118 are disposed upon. In embodiments in which item 114 is disposed on a different side of insert 110 from redeemable code 112, insert code 116, and control code 118, release surface 115 can be provided only on the side of insert 110 at which item 114 is provided. For example, item 114 can be disposed on a front outer surface of insert 110 (FIG. 3) and redeemable code 112, insert code 116, and control code 118 can each be disposed on a rear outer surface of insert 110 (FIG. 4). Alternatively, item 114 can be disposed on rear outer surface of insert 110 and redeemable code 112, insert code 116, and control code 118 can be disposed on front outer surface of insert 110. Matte release surface 115 can be applied directly to the same single-layer stock on which redeemable code 112, insert code 116, and control code 118 are disposed (e.g., insert 110 may be formed of single-layer stock, not laminated). In embodiments, item 114 can be disposed on the same outer surface of insert 110 as redeemable code 112. For example, item 114 can be disposed on a central portion of the outer surface and redeemable code 112 can be disposed above, below, to the left, or to the right of item 114.

Sleeve 120 can include an activation code 128, which can be associated with and used to activate redeemable code 112 to make its associated value redeemable. Activation code 128 can be different from redeemable code 112. Activation code 128 can be a bar code, a magnetic strip, an RFID, or any other suitable code, as defined herein. Activation code 128 can be provided on any outer surface of sleeve 120, such as a rear surface of sleeve 120; however, activation code 128 is neither provided within an interior of sleeve 120 nor on insert 110. That is, activation code 128 is provided only on a visually accessible outer surface of sleeve 120.

Activation code 128 may be unique to sleeve 120. For example, embodiments can include a plurality of packaged redeemable code systems 100, each with a respective insert 110 and sleeve 120. The activation code 128 of each sleeve 120 may be unique (i.e., different) relative to activation codes 128 of other sleeves 120.

In embodiments, sleeve 120 can include a control code 140, which can correspond to an aspect of the manufactured sleeve 120, such as a denomination, a promotional suite that can include combinations of colors, symbols, indicia, brands, etc. Control code 140 can be provided on an outer surface of sleeve 120. Control code 140 can include, for example, any visual human-readable representation of data or any optical machine-readable representation of data. Examples include text having any number of characters, symbols, or indicia. Control code 140 has no redeemable value.

In some embodiments, the codes included on sleeve 120 (i.e., activation code 128, control code 140) may be separate or may be combined in any combination into one or more combined codes. Further, some embodiments may include fewer than all of activation code 128, control code 140. For example, some embodiments may include only activation code 128.

In embodiments, sleeve 120 can include one or more closure 124. In embodiments, closure 124 can be a surface of sleeve 120, such as a flap, that closes the interior of sleeve 120. In embodiments, closure 124 may join edges of sleeve 120, with or without a flap. Closure 124 can be sealed, such as with adhesive. Closure 124 can be opened to provide an opening 135 in sleeve 120. Opening 135 can provide an access point for removal of insert 110 enclosed within sleeve 120.

In embodiments, sleeve 120 can be formed of paper, which is readily recyclable. Alternatively, sleeve 120 can be formed of other suitable materials including plastics, metals, etc. In embodiments where both sleeve 120 and insert 110 are both formed of paper, they may both be recyclable together in a single recycling stream.

Although described as including one insert 110, in embodiments sleeve 120 can include more than one insert 110 (e.g., a first insert, second insert, etc.).

Figure 2:
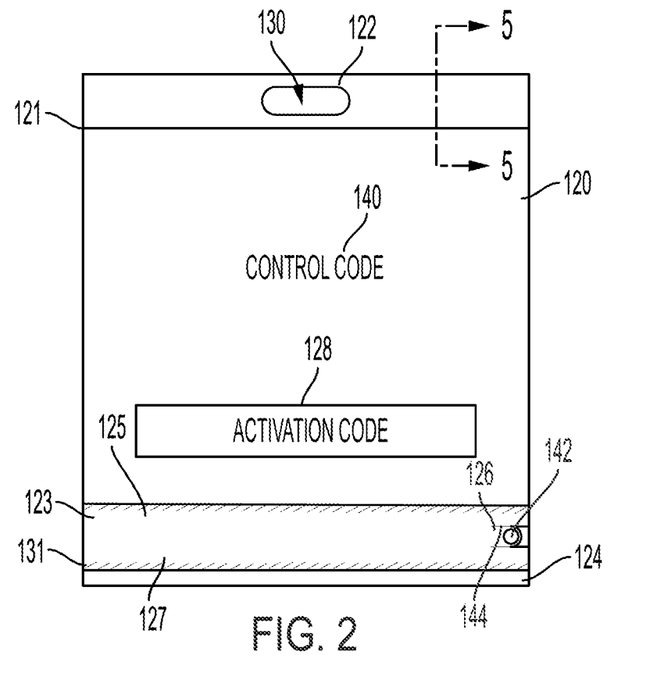
FIG. 2 shows a rear view of the packaged redeemable code system of FIG. 1.
Figure 3:
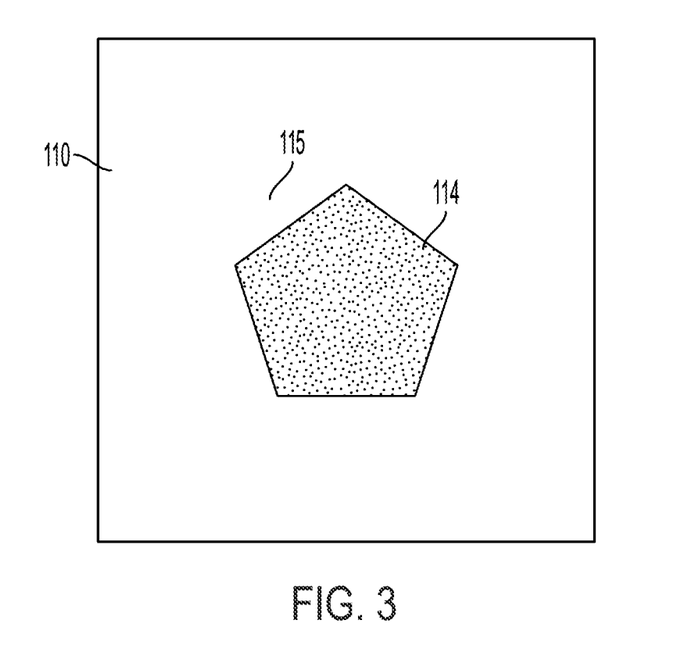
FIG. 3 shows a front view of the insert removed from the packaged redeemable code system of FIG. 1.

In embodiments, sleeve 120 can include a hang tab 122 that can allow the packaged redeemable code system 100 to be hung on display, e.g., in a retail environment. Hang tab 122 can be provided at an edge 121 of sleeve 120. Edge 121 of sleeve 120 can be an upper edge, as shown in FIGS. 1 and 2. Hang tab 122 can be a planar surface that projects a predetermined amount from edge 121 of sleeve 120. In embodiments, hang tab 122 can project above edge 121 of sleeve 120 by the predetermined amount. Hang tab 122 can include an opening 130 from which packaged redeemable code system 100 can be hung. Hang tab 122 can have a strength sufficient to hold packaged redeemable code system 100 in a hanging position.

Hang tab 122 can be removable from edge 121 of sleeve 120. In embodiments, hang tab 122 can be configured such that when removed remaining edge 121 of sleeve 120 is clean and does not fray, as compared to perforated paper edges that result in a frayed edge upon removal.

Figure 5:
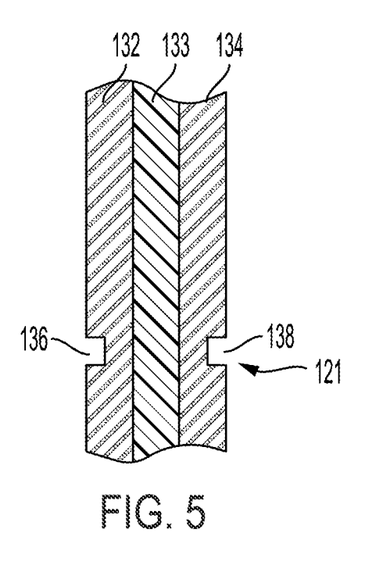
FIG. 5 shows a cross-sectional view of the sleeve of FIG. 2 taken along line 5-5.

FIG. 5 shows a cross sectional view of an exemplary removable hang tab 122. In embodiments, removable hang tab 122 shown in FIG. 5 may correspond to hang tab 122 shown in FIGS. 1 and 2. For example, removable hang tab 122 shown in FIG. 5 may correspond to a cross-sectional view of hang tab 122 of FIG. 2 taken along line 2-2. Removable hang tab 122 can have single direction clean tearing functionality. That is, hang tab 122 can tear only in a single direction and instead of producing a serrated non-uniform tear line, hang tab 122 may produce a clean uniform tear line.

In embodiments, hang tab 122 can be a laminate structure including first outer layer 132 and second outer layer 134 that sandwich an intermediary layer 133. First outer layer 132 and second outer layer 134 of hang tab 122 can each respectively include scored portions 136, 138 across edge 121 of sleeve 120. As shown in FIG. 5, scored portions 136, 138 may extend partially through first and second outer layers 132, 134, respectively. In some embodiments scored portions 136, 138 may extend entirely through first and second outer layers 132, 134, respectively, and hang tab 122 may be attached to edge only via intermediary layer 133. First outer layer 132 and second outer layer 134 of hang tab 122 can be formed of paper or other suitable materials. Intermediary layer 133 of hang tab 122 can be comprised of a material that tears across one grain in only one direction, such as a mono-oriented material (e.g., mono-oriented polypropylene (MOPP)) or other similar material. The one grain direction can be arranged in the same direction as (i.e., parallel with) scored portions 136, 138 of first and second outer layers 132, 134 of the hang tab 122. Accordingly, laminate structure of hang tab 122 can be removed from edge 121 of sleeve 120 and remaining edge 121 of sleeve 120 can be clean and will not fray.

Figure 6:
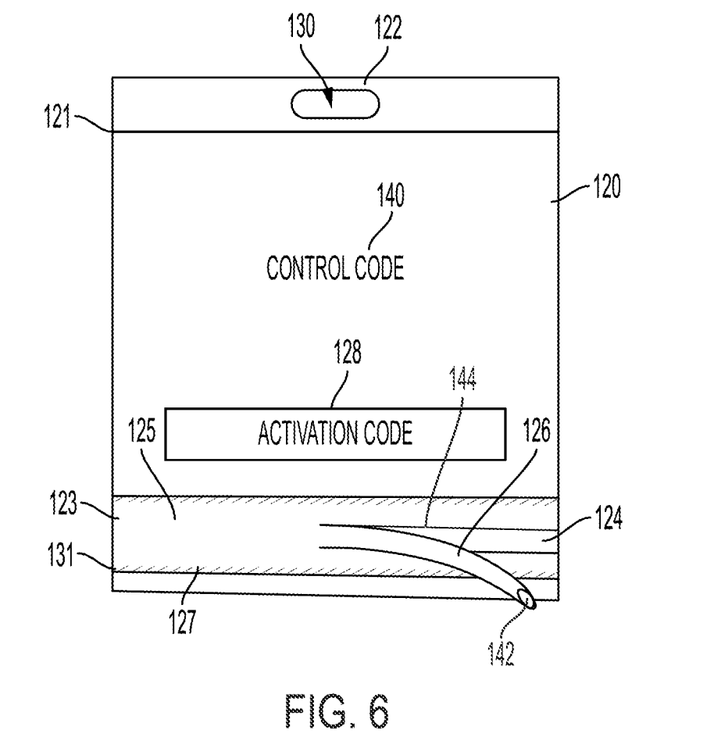
FIG. 6 shows a ripcord partially removed from the sleeve of FIG. 2.

FIGS. 2, 6, and 7 show aspects of an exemplary ripcord 126. In embodiments, ripcord 126 may be incorporated into sleeve 120 of packaged redeemable code system 100 shown for example in FIG. 1. Ripcord 126 can be attached to sleeve 120 such that when pulled by a user an opening can be formed in sleeve 120 to provide an access point for removal of insert 110 enclosed within sleeve 120.

In embodiments, ripcord 126 can be an integral part of a strip 123. Strip 123 may act as a seal for sleeve 120, to seal insert 110 within sleeve 120. Strip 123 may take the form of, for example, a label applied across and sealing an opening, as described in more detail below. Ripcord 126 can define an intermediary portion of a strip 123. Ripcord 126 can include an end that provides the starting direction for tearing the intermediary portion of strip 123.

In embodiments, ripcord 126 can be configured for one-time use such that it would be evident to a legitimate purchaser if another user had attempted to open sleeve 120 by pulling ripcord 126.

As shown in FIG. 2, strip 123 can include an upper portion 125 and a lower portion 127. Upper portion 125 can be adhered to a face of sleeve 120. Lower portion 127 can be adhered to closure 124. Ripcord 126 can be an integral part of strip 123 that bisects the strip 123 between upper and lower portions 125, 127.

In embodiments, ripcord 126 can be configured such that ripcord 126 is not directly adhered to sleeve 120. Instead, ripcord 126 can be indirectly connected to sleeve 120 by virtue of connection with upper and lower portions 125, 127.

For example, in embodiments strip 123 can include adhesive at only upper and lower portions 125, 127, and ripcord 126 can be free from adhesive.

In alternative embodiments, strip 123 can include an adhesive across bottom faces of upper and lower portions 125, 127 and of ripcord 126. Prior to adhering strip 123 to sleeve 120, a deadening material can be applied to ripcord 126 to deaden adhesive at ripcord 126 and promote removal of ripcord 126 from sleeve 120. Using a deadening material over adhesive at ripcord 126 can improve the manufacturability of strip 123.

Strip 123 can be comprised of a material that tears in only one direction, such as MOPP or other similar material. For example, strip 123 can be comprised of a material such that ripcord 126 tears along material grains in only one direction at interfaces between upper and lower portions 125, 127.

As shown in FIG. 2, strip 123 and ripcord 126 can be a continuous, integral sheet of MOPP and ripcord 126 can define a pull tab 142 having parallel cuts 144 cutting into the continuous sheet. The pull tab 142 may protrude out from body of strip 123 along the direction in which parallel cuts 144 extend. When pull tab 142 is pulled by a user, the continuous sheet of strip 123 may tear and extend parallel cuts 144 along material grains in only one direction, i.e., in the grain direction of the mono-oriented material of strip 123, as shown in FIG. 6. In embodiments, ripcord 126 can break the seal of closure 124 to permit opening of closure 124, as shown in FIG. 7. For example, strip 123 can extend entirely across a width of sleeve 120, and pulling ripcord 126 apart from the rest of strip 123 may completely separate upper portion 125 from lower portion 127, thereby allowing sleeve 120 to be opened.

In embodiments, strip 123 can include security features. The security features can provide evidence that strip 123 has been tampered with. For example, the security features can be security cuts 131 extending into strip 123. Security cuts 131 can extend from outer edges of strip 123 and can cause strip 123 to tear when edges are pulled. For example, if an unauthorized user pulls on edges of strip 123 in an attempt to temporarily remove strip 123 to access insert 110, strip 123 can tear at security cuts 131. Tearing can provide evidence to a legitimate user that strip 123 may have been tampered with. In embodiments, security features can alternatively or additionally include a holographic pattern applied (e.g., printed) on an outer visible surface of strip 123. The holographic pattern can prevent tampering by making it more difficult to remove strip 123 and swap with another strip 123, since replacement strip 123 would also have to include the holographic pattern or it would be evident that strip 123 had been tampered with.

Sleeve 120 can include a cutout 129 that can align with and provide visual access to at least a portion of insert 110 while insert 110 is enclosed within the sleeve. Cutout 129 can be different from opening 135 through which insert 110 is removed from sleeve 120. Insert 110 cannot be removed through cutout 129. Cutout 129 may be embodied in a plurality of shapes and sizes.

In embodiments, cutout 129 may be smaller than insert 110 such that insert 110 may not fit through cutout 129.

In embodiments, cutout 129 may be smaller than item 114 such that item 114 may not fit thorough cutout 129.

In embodiments, cutout 129 may be a different shape than item 114.

In alternative embodiments cutout 129 may be a same shape as item 114.

As shown in FIG. 1, cutout 129 can be provided through a front surface of sleeve 120 and can provide visual access to a front surface of insert 110 enclosed within sleeve 120. Insert 110 can align with cutout 129 and can provide color or contrast with the front surface of sleeve 120.

In embodiments, item 114 of insert 110 can align with cutout 129 to provide visual access to item 114 enclosed within sleeve 120.

Cutout 129 can have a meaningful shape. Meaningful shape, as used herein, can be a shape having a meaning that a purchaser can recognize and understand as something more than a simple geometric shape. Meaningful shapes can include, for example, branding, logos, indicia, characters, silhouettes, etc. Meaningful shape does not include a window of square, rectangular, or circular shape that merely provides visual access to an interior without the shape itself conveying a meaning.

In embodiments, item 114 and cutout 129 can have the same shape (e.g., a meaningful shape).

In alternative embodiments, item 114 and cutout 129 can be different shapes.

Cutout 129 and insert 110 can be arranged such that visual access is not provided to redeemable code 112 of insert 110 when insert 110 is enclosed within the interior of sleeve 120. In embodiments, redeemable code 112 can be provided on insert 110 and cutout 129 can be provided through sleeve 120 such that redeemable code 112 is misaligned with cutout 129 when insert 110 is enclosed within the interior of sleeve 120. In embodiments, insert 110 can be positioned within sleeve 120 such that redeemable code 112 faces an opposite side of the interior of sleeve 120 from the side at which cutout 129 is provided through.

Figure 8:
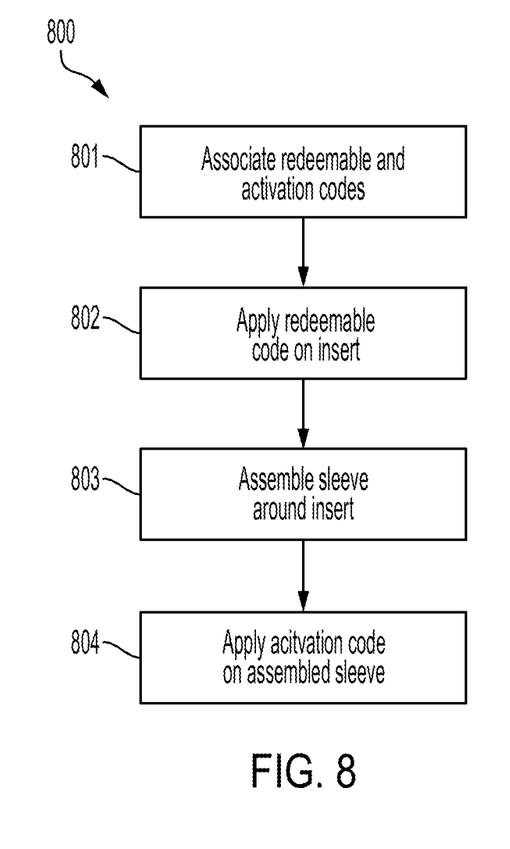
FIG. 8 shows a process of packaging a redeemable code system.

FIG. 8 shows an exemplary process 800 of packaging a redeemable code system. The redeemable code system can be any embodiments of the redeemable code system 100 described herein.

Process 800 can include, at step 801, associating redeemable code 112 and activation code 128. Redeemable code 112 can be associated with a value (e.g., monetary value) in a database that upon activation can be redeemed by a user. Activation code 128 can be used to activate redeemable code 112 to make its associated value redeemable.

In embodiments, associating redeemable code 112 and activation code 128 can include pairing insert code 116 with each of redeemable code 112 and activation code 128 in a database. Insert code 116 may be a serial number of insert 110 that may serve as an identifier during subsequent steps of process 800.

In embodiments, insert code 116 can also be paired with control code 118 or control code 140 in the database. Control code 118 can correspond to an aspect of the manufactured insert 110, such as a denomination, a promotional suite that can include combinations of colors, symbols, indicia, brands, etc. Control code 140 can correspond to an aspect of the manufactured sleeve 120, such as a denomination, a promotional suite that can include combinations of colors, symbols, indicia, brands, etc.

In embodiments, each of insert code 116, redeemable code 112, activation code 128, control code 118, and control code 140 can be paired together in the database. As a result, upon user redemption of redeemable code 112 manufacturer may track any of insert code 116, activation code 128, control code 118, and control code 140 associated with the redeemable code 112.

At step 802, process 800 can include applying (e.g., printing) redeemable code 112 on insert 110. For example, step 802 may include automatically reading insert code 116, which may be pre-applied (e.g., pre-printed) on insert 110. After reading insert code 116, redeemable code 112 paired with insert code 116 at step 801 can be applied on insert 110. In such embodiments, insert code 116 can serve as an identifier to ensure that redeemable code 112 is applied on the correct insert 110, i.e., insert 110 having insert code 116 paired with redeemable code 112 at step 801. Insert code 116 may have no redeemable value by itself.

In embodiments, control code 118, which can be paired with insert code 116 at step 801, can also be applied on insert 110.

Embodiments may include applying release surface 115 and adhering item 114 to an outer face of insert 110. Release surface 115 may be provided before, or alternatively after, applying redeemable code 112 or control code 118. Insert 110 can be provided as a flat paper (e.g., cardstock) sheet. Applying release surface 115 can include coating one side of the flat paper sheet with matte release surface coating. Item 114 can be adhered directly to release surface 115 obviating the need for a disposable intermediary backing for item 114.

Embodiments may include die cutting insert 110 into a predetermined shape. Alternatively, insert 110 may be pre-die cut.

At step 803, the process 800 may include assembling sleeve 120 around insert 110. Assembling sleeve 120 may include folding sleeve 120 over upon itself, with insert 110 trapped inside, and attaching ends of sleeve 120 together, e.g., with an adhesive such as a glue. Assembling sleeve 120 may include arranging insert 110 such that item 114 is visible through cutout 129. Assembling sleeve 120 may include adhering strip 123 to close closure 124.

In embodiments, sleeve 120 can be a laminated flat sheet.

In embodiments, sleeve 120 may be die cut into a predetermined shape.

In embodiments, hang tab 122 and/or cutout 129 may be formed in sleeve 120.

FIGS. 9-13 show, in order, an exemplary packaged redeemable code system 200 throughout various stages of assembly in accordance with embodiments of step 803. Like reference numerals of packaged redeemable code system 200 correspond to like reference numerals of embodiments of packaged redeemable code system 100, described previously herein. Insert 210 is depicted transparently in FIGS. 9-11 for the purpose of better illustrating the positioning of insert 210 relative to sleeve 220. Nevertheless, insert 210 itself may not be transparent.

Figure 9:
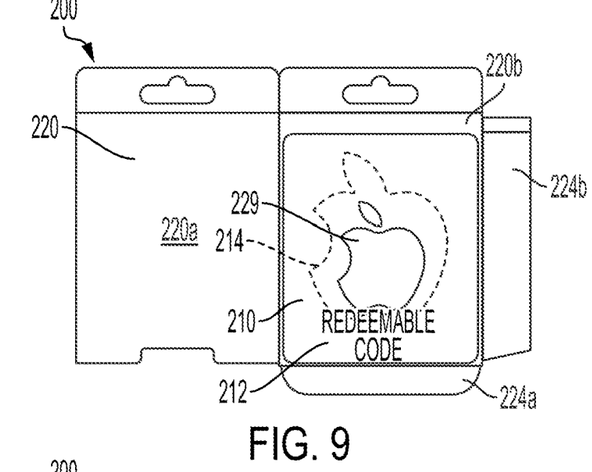
FIG. 9 shows a top view of an insert positioned on an unassembled sleeve.

As shown in FIG. 9, step 803 may include positioning insert 210 on a flat unassembled sleeve 220. Unassembled sleeve 220 may include a back 220a and front 220b. Front 220b may include cutout 229. Front 220b may include a first closure 224a, which may be a bottom flap. Front 220b may include a second closure 224b, which may be a side flap. Insert 210 includes redeemable code 212 applied on a back face of insert 210 at step 802. Insert 210 may include item 214, which may be a removable sticker adhered to a front face of insert 210. Front face of insert 210 may be positioned on front 220b of unassembled sleeve 220 such that item 214 faces and is visible through cutout 229, as shown in FIG. 9.

Figure 10:
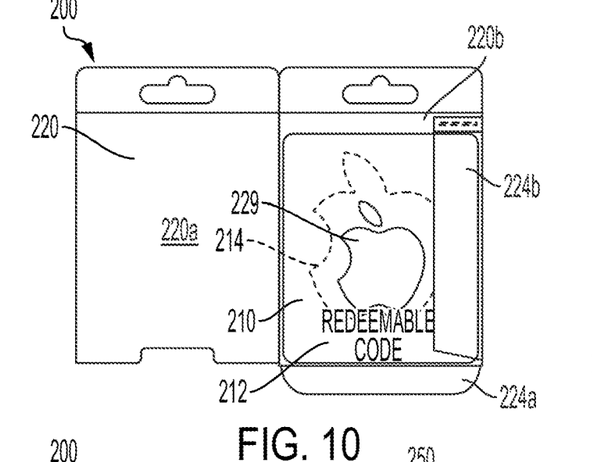
FIG. 10 shows a folded closure of the unassembled sleeve of FIG. 9.

As shown in FIG. 10, step 803 may include folding second closure 224b over onto insert 210.

Figure 11:
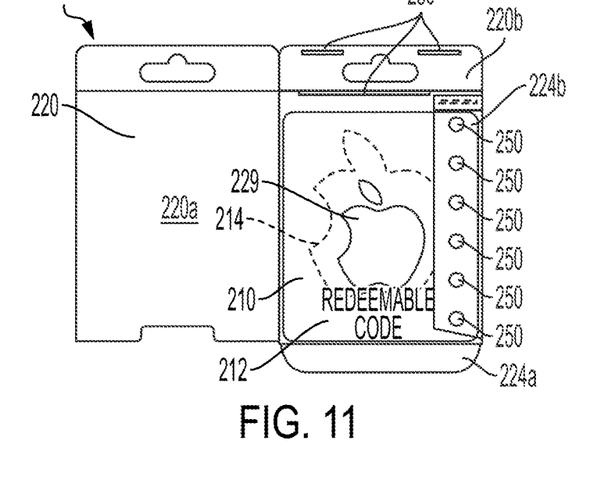
FIG. 11 shows adhesive applied to the unassembled sleeve of FIG. 9.

As shown in FIG. 11, step 803 may include applying adhesive 250 to unassembled sleeve 220. In embodiments, adhesive 250 may be applied to second closure 224b and to a top of front 220b above insert 210. Adhesive 250 may be applied as dots or in rows. Adhesive does not directly contact insert 210.

Figure 12:
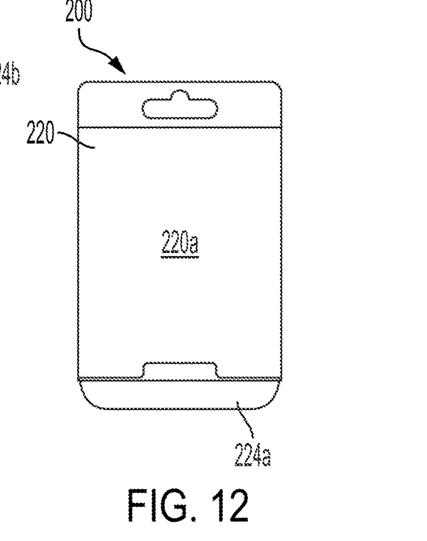
FIG. 12 shows the sleeve of FIG. 9 folded over upon itself.

As shown in FIG. 12, step 803 may include folding back portion 220a onto front portion 220b and adhering back portion 220a and front portion 220b together with adhesive 250.

Figure 13:
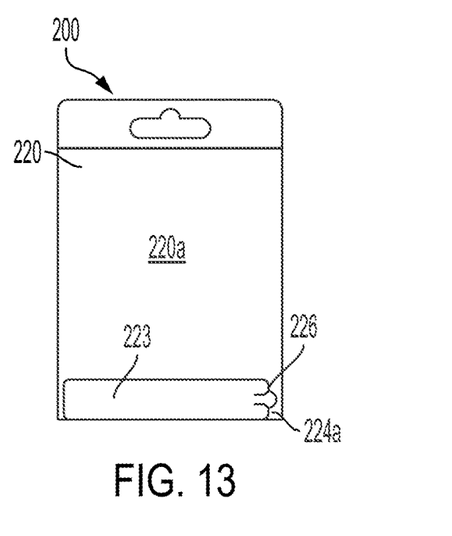
FIG. 13 shows the sleeve of FIG. 9 fully assembled.

As shown in FIG. 13, step 803 may include folding first closure 224a and adhering ripcord 226, including strip 223, to first closure 224a and back portion 220a to seal insert 210 within interior pocket of fully assembled sleeve 220.

Referring back to FIG. 8, in embodiments, steps 802 and 803 can be performed sequentially, which can limit the amount of time that the redeemable code 212 is exposed, i.e., not concealed within sleeve 220. In such embodiments, the redeemable code 212, which will subsequently be activated and represent a tangible value, can be kept secure during manufacturing.

At step 804, process 800 can conclude by applying activation code 128 associated with redeemable code 112 at step 801 onto assembled sleeve 120.

The following provides an example use of packaged redeemable code system 100. As explained in step 801 above, activation code 128 provided on sleeve 120 can be associated with redeemable code 112 provided on insert 110. Activation code 128 provided on sleeve 120 can be different from redeemable code 112 provided on insert 110.

In embodiments, associating activation code 128 with redeemable code 112 can include pairing the different activation code 128 and redeemable code 112 in a database.

In embodiments, associating activation code 128 with redeemable code 112 can include pairing activation code 128, redeemable code 112, and insert code 116 in the database.

In embodiments, control code 118 or control code 140 can also be paired in the database with redeemable code 112. Pairing control code 118 or control code 140 with redeemable code 112 can allow the control codes to be tracked upon redemption of redeemable code 112.

Upon distribution of packaged redeemable code system 100 to an intended recipient, its redeemable code 112 concealed within sleeve 120 may be activated such that the associated value of redeemable code 112 can be redeemed. An authorized user (e.g., a store clerk) may locate redeemable code 112 within the database using activation code 128. For example, the authorized user may scan activation code 128 with a scanner and automatically access the database and activate redeemable code 112 using a computer system.

Once its associated activation code 128 is used to activate redeemable code 112, the value associated with redeemable code 112 can be redeemed (e.g., by the intended recipient). Upon use, the intended recipient may remove insert 110 from sleeve 120, use redeemable code 112 to access the database, and redeem the value associated with redeemable code 112.

In some embodiments, value may not be associated with redeemable code 112 until activation code 128 is used by an authorized user to activate redeemable code 112, which in addition to activating redeemable code 112 also associates the value with redeemable code 112 and allows the value to be redeemed by the intended recipient.

Figure 14:
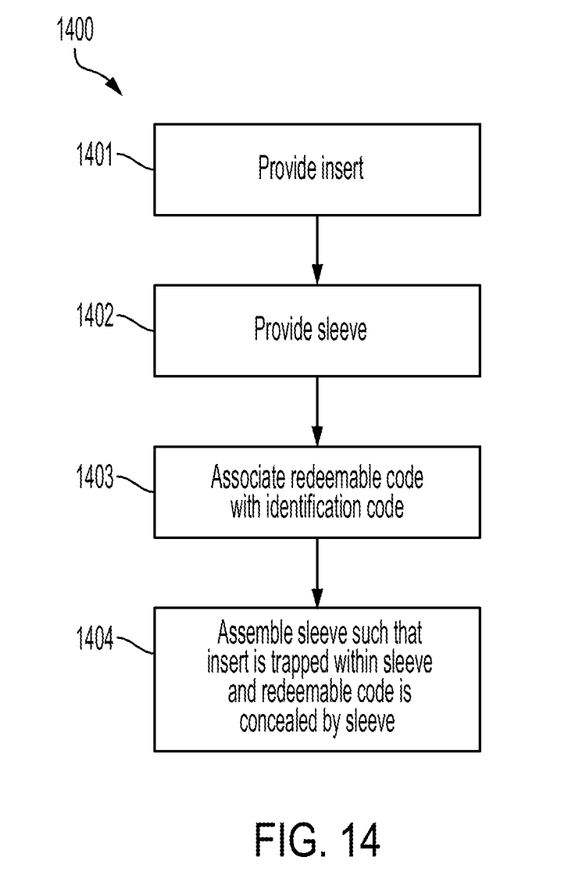
FIG. 14 shows another process of packaging a redeemable code system.

FIG. 14 shows another exemplary process 1400 of packaging a redeemable code system. The redeemable code system can be any embodiments of the redeemable code system 100 described herein.

Process 1400 may include, at step 1401, providing insert 110. Providing insert 110 at step 1401 may include applying (e.g., printing) redeemable code 112 on insert 110. Alternatively, redeemable code 112 can be printed on insert 110 at a subsequent step of process 1400, as described herein. Insert 110 can be provided as a flat sheet. Providing insert 110 may include laminating at least part of the flat sheet. In embodiments, laminating the flat sheet may occur prior to any other aspects of providing insert 110 described herein. Providing insert 110 may include die cutting insert 110 into a predetermined shape. Providing insert 110 may include removably attaching item 114 to flat sheet of insert 110.

Process 1400 may include, at step 1402, providing sleeve 120. Providing sleeve 120 at step 1402 may include applying activation code 128 thereon. Alternatively, activation code 128 can be applied on sleeve 120 at a subsequent step of process 1400 as described herein. Sleeve 120 can be provided as a flat sheet. Providing sleeve 120 may include laminating the flat sheet. In embodiments, laminating the flat sheet may occur prior to any other aspects of providing sleeve 120 described herein. Providing sleeve 120 may include die cutting sleeve 120 into a predetermined shape. Providing sleeve 120 may include forming hang tab 122. Providing sleeve 120 may include forming cutout 129. Step 1402 may occur after, or in the alternative, before step 1401.

Process 1400 may include, at step 1403, associating redeemable code 112 with activation code 128, as previously described herein. Step 1403 may occur before, or in the alternative after, or in the alternative in between steps 1401 and 1402. Accordingly to this disclosure, "uniquely pairing" a particular insert 110 with a particular sleeve 120 may occur upon completion of each of applying redeemable code 112 on insert 110, applying activation code 128 on sleeve 120, and associating redeemable code 112 and activation code 128. That is, insert 110 and sleeve 120 are "uniquely paired" when redeemable code 112 is applied upon insert 110, activation code 128 is applied upon sleeve 120, and redeemable code 112 and activation code 128 are associated. In embodiments, redeemable code 112 can be applied upon insert 110 at step 1401, activation code 128 can be applied on sleeve 120 at step 1402, and step 1403 may include uniquely pairing insert 110 and sleeve 120 by associating the respective applied codes. In alternative embodiments, uniquely pairing insert 110 and sleeve 120 can be delayed until step 1404.

Process 1400 may conclude at step 1404, by assembling sleeve 120 such that a uniquely paired insert 110 is trapped within sleeve 120 and redeemable code 112 is concealed by sleeve 120. Assembling sleeve 120 may include folding sleeve 120 upon over upon itself, with insert 110 trapped inside, and attaching ends of sleeve 120 together, e.g., with an adhesive such as a glue. Assembling sleeve 120 may include arranging insert 110 such that item 114 is visible through cutout 129. Assembling sleeve 120 may include adhering strip 123 to close closure 124.

In embodiments, step 1404 can begin by uniquely pairing insert 110 and sleeve 120. For example, insert 110 can be provided with redeemable code 112 thereon at step 1401 and sleeve 120 can be provided at step 1402 without activation code 128 at step 1402. Process 1400 may include laying insert 110 on sleeve 120 and automatically reading redeemable code 112. Thereafter, redeemable code 112 can be associated with activation code 128 at step 1403. At step 1404, assembling sleeve 120 may include applying the associated activation code 128 on sleeve 120 and thereby uniquely pairing insert 110 and sleeve 120. By delaying the unique pairing of insert 110 and sleeve 120 until step 1404, insert 110 and sleeve 120 can be manufactured independently and paired upon assembly of sleeve 120, thereby improving the manufacturability of the redeemable code system.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A packaged redeemable code system comprising:
    a paper insert comprising:
        a front surface having a removable item; and
        a rear surface having a redeemable code; and
    a paper sleeve comprising:
        an interior that encloses the paper insert and conceals the redeemable code; and
        a front surface having a cutout extending therethrough, wherein the cutout aligns with and provides visual access to the removable item, wherein the removable item is a different color than or provides contrast with the front surface of the paper sleeve;
        a rear surface having an activation code, wherein the activation code is associated with the redeemable code; and
        a ripcord configured to open an edge of the paper sleeve to provide access for removal of the paper insert, wherein the ripcord is formed of a mono-oriented material and is configured to leave a clean edge when torn away.

2. The packaged redeemable code system according to claim 1, wherein the paper insert is a transaction card.

3. The packaged redeemable code system according to claim 1, wherein the redeemable code comprises text.

4. The packaged redeemable code system according to claim 1, wherein
    the paper insert is single-layer paper stock;
    the front surface of the paper insert includes a release surface having a matte surface coating, and
    the removable item is a sticker adhered directly to the release surface.

5. The packaged redeemable code system according to claim 1, wherein the paper sleeve further comprises a hang tab at another edge of the paper sleeve.

6. The packaged redeemable code system according to claim 5, wherein the hang tab is removable and is configured to leave a clean edge when removed.

7. The packaged redeemable code system according to claim 6, wherein the hang tab comprises at least one layer of mono-oriented material.

8. The packaged redeemable code system according to claim 1, wherein the cutout has a meaningful shape.

9. The packaged redeemable code system according to claim 1, wherein the ripcord does not include perforations.

10. A packaged redeemable code system comprising:
    an insert comprising a removable item, an insert code, and a redeemable code; and
    a sleeve comprising:
        an interior that encloses the insert and conceals the redeemable code;
        a front surface having a cutout extending therethrough, wherein the cutout aligns with and provides visual access to the removable item; and
        a rear surface having an activation code, wherein the activation code is associated with the redeemable code and is not the same as the redeemable code,
    wherein the redeemable code is not provided on the sleeve, and
    wherein the activation code is not provided on the insert,
    wherein the redeemable code is printed on the insert and the activation code is printed on the rear surface of the sleeve, and
    wherein the insert code pairs the redeemable code with the activation code so that the redeemable code is associated with the activation code.

11. The packaged redeemable code system according to claim 10, wherein the insert is a transaction card.

12. The packaged redeemable code system according to claim 10, wherein the redeemable code is associated with the activation code in a database.

13. The packaged redeemable code system according to claim 10, wherein a redeemable value of the redeemable code is configured to be activated via the activation code.

14. The packaged redeemable code system according to claim 13, wherein the redeemable value is not redeemable before activation with the activation code.

15. The packaged redeemable code system according to claim 10, wherein the insert is a transaction card,
   wherein the redeemable code is applied on the transaction card as text,
   wherein the removable item is a sticker that provides a visual contrast with the sleeve through the cutout.

16. The packaged redeemable code system according to claim 10, wherein the sleeve comprises a hang tab,
   wherein the sleeve comprises a ripcord configured to open the sleeve to provide an opening for removal of the insert, and
   wherein the cutout has a meaningful shape.

17. A method of packaging a redeemable code system comprising:
   associating a redeemable code with an activation code;
   applying the redeemable code on an insert, wherein the insert comprises a removable item;
   arranging the insert within a sleeve such that the redeemable code is not visible from an exterior of the sleeve;
   sealing the sleeve with the insert inside; and
   applying the activation code on a rear exterior surface of the sleeve after the insert has been sealed within the sleeve,
   wherein the sleeve comprises:
      an interior that encloses the insert and conceals the redeemable code; and
      a front surface having a cutout extending therethrough, wherein the cutout aligns with and provides visual access to the removable item,
   wherein the activation code is not the same as the redeemable code,
   wherein the redeemable code is not provided on the sleeve, and
   wherein the activation code is not provided on the insert.

18. The method of packaging the redeemable code system according to claim 17, wherein associating the redeemable code with the activation code comprises pairing the redeemable code and the activation code with an insert code disposed on the insert,
   wherein applying the redeemable code to the insert comprises printing the redeemable code on the insert, and
   wherein applying the activation code to the rear exterior surface of the sleeve comprises printing the activation code on the rear exterior surface of the sleeve.

19. The method of packaging the redeemable code system according to claim 17, wherein arranging the insert within the sleeve comprises assembling the sleeve around the insert.

20. The method of packaging the redeemable code system according to claim 17, wherein arranging the insert within the sleeve comprises:
   positioning the insert on the sleeve, the sleeve being a flat sheet,
   folding the flat sheet over the insert, and
   sealing edges of the flat sheet around the insert.

21. The method of packaging the redeemable code system according to claim 17, wherein applying the activation code on the sleeve occurs subsequent to assembling the sleeve around the insert.

\* \* \* \* \*